(12) United States Patent
Axelrod et al.

(10) Patent No.: US 9,078,415 B2
(45) Date of Patent: Jul. 14, 2015

(54) FLOATING PET TOY

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 59 days.

(21) Appl. No.: 14/079,097

(22) Filed: Nov. 13, 2013

(65) Prior Publication Data

US 2015/0128874 A1 May 14, 2015

(51) Int. Cl.
| | | |
|---|---|---|
| *A01K 29/00* | (2006.01) | |
| *A01K 15/02* | (2006.01) | |
| *B29C 45/14* | (2006.01) | |
| *B29C 45/16* | (2006.01) | |
| *B29L 9/00* | (2006.01) | |
| *B29L 31/52* | (2006.01) | |
| *B29K 7/00* | (2006.01) | |
| *B29K 23/00* | (2006.01) | |

(52) U.S. Cl.
CPC ......... *A01K 15/025* (2013.01); *B29C 45/14311* (2013.01); *B29C 45/1671* (2013.01); *B29C 2045/14319* (2013.01); *B29K 2007/00* (2013.01); *B29K 2023/22* (2013.01); *B29L 2009/005* (2013.01); *B29L 2031/529* (2013.01)

(58) Field of Classification Search
CPC .................................................. A01K 15/025
USPC ................... 119/707; 446/153; 441/6, 46, 44; 273/350
See application file for complete search history.

(56) References Cited

U.S. PATENT DOCUMENTS

| | | | | |
|---|---|---|---|---|
| 1,399,855 | A | * | 12/1921 | Fierlein .......................... 446/156 |
| 5,467,740 | A | * | 11/1995 | Redwine ........................ 119/707 |
| 5,797,353 | A | | 8/1998 | Leopold |
| 5,865,662 | A | * | 2/1999 | Dammann ..................... 446/153 |
| 5,904,118 | A | | 5/1999 | Markham |
| 6,092,489 | A | * | 7/2000 | Huettner et al. ............... 119/707 |
| 6,332,822 | B2 | * | 12/2001 | Greenberg et al. ........... 446/153 |
| D503,998 | S | | 4/2005 | Axelrod |
| 7,258,836 | B2 | * | 8/2007 | Hill et al. ......................... 422/50 |
| 7,677,947 | B2 | * | 3/2010 | Wong .............................. 446/153 |
| 7,850,505 | B2 | * | 12/2010 | Wong .............................. 446/153 |

(Continued)

FOREIGN PATENT DOCUMENTS

WO 2011/085413 7/2011

OTHER PUBLICATIONS

International Search Report and Written Opinion from related PCT Appln. No. PCT/US2014/061698 dated Feb. 5, 2015.

*Primary Examiner* — Kristen C Hayes
(74) *Attorney, Agent, or Firm* — Grossman, Tucker, Perreault & Pfleger, PLLC

(57) ABSTRACT

A pet toy to aid a pet in developing retrieval skills comprising a first member at least partially encapsulated within a second member; wherein the first member is formed of a first member polymer composition having a density less than 1.0 gram/cubic centimeter; wherein the second member is formed of a second member polymer composition having a density greater than 1.0 gram/cubic centimeter; wherein the first member and the second member are provided at a weight ratio such that the pet toy floats when placed in water; and wherein the second member weighs down a second end of the pet toy in water such that a first end of the pet toy rises above the second end of the pet toy.

20 Claims, 5 Drawing Sheets

(56) References Cited

U.S. PATENT DOCUMENTS

| | | | |
|---|---|---|---|
| 7,971,556 B2* | 7/2011 | Wechsler | 119/711 |
| 8,011,325 B2* | 9/2011 | Jager | 119/707 |
| 8,453,608 B2* | 6/2013 | Lind | 119/707 |
| 8,474,410 B2 | 7/2013 | Oblack et al. | |
| 2006/0225666 A1 | 10/2006 | Axelrod | |
| 2007/0212456 A1 | 9/2007 | Axelrod | |
| 2009/0229535 A1* | 9/2009 | Lind | 119/707 |
| 2010/0064983 A1* | 3/2010 | Ritchey et al. | 119/707 |
| 2010/0224138 A1 | 9/2010 | Axelrod et al. | |
| 2011/0277696 A1 | 11/2011 | Rutherford et al. | |
| 2011/0297104 A1 | 12/2011 | Axelrod et al. | |
| 2012/0192807 A1 | 8/2012 | Rutherford et al. | |

* cited by examiner

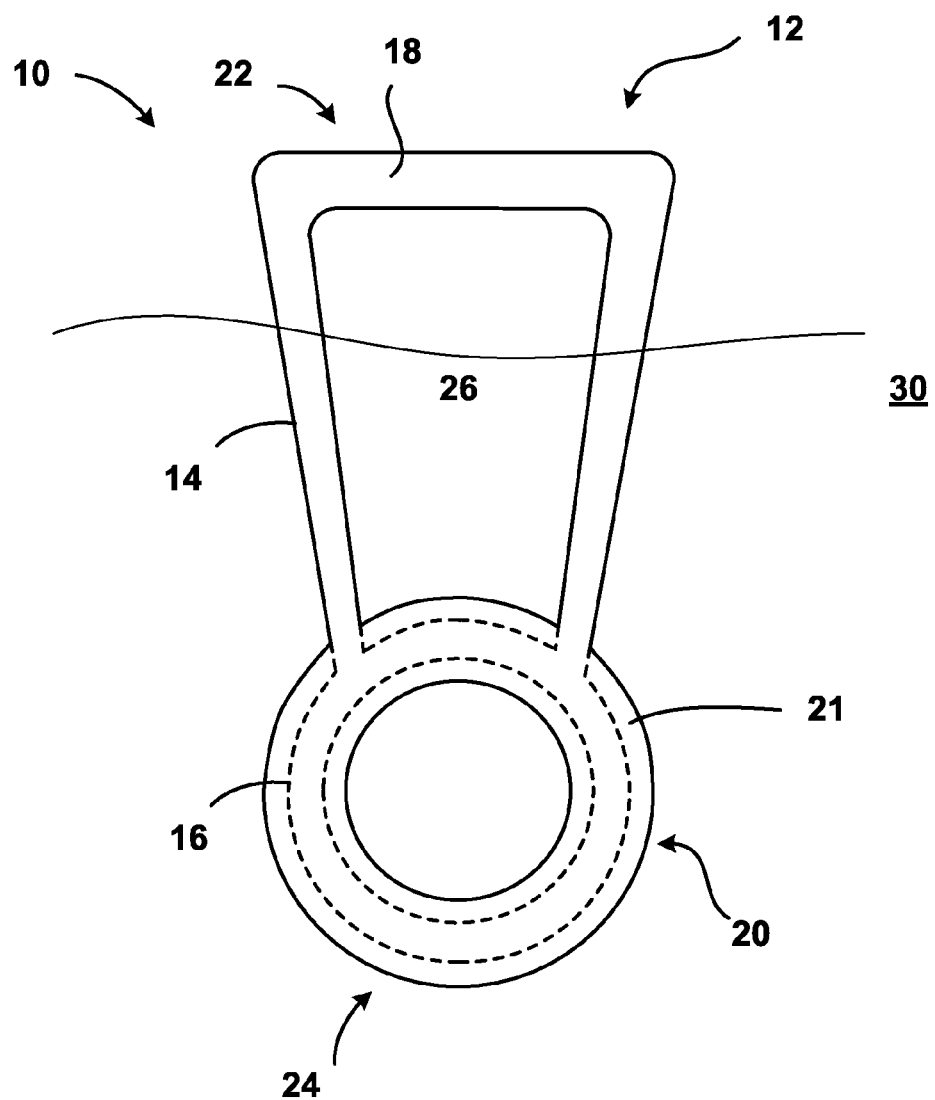

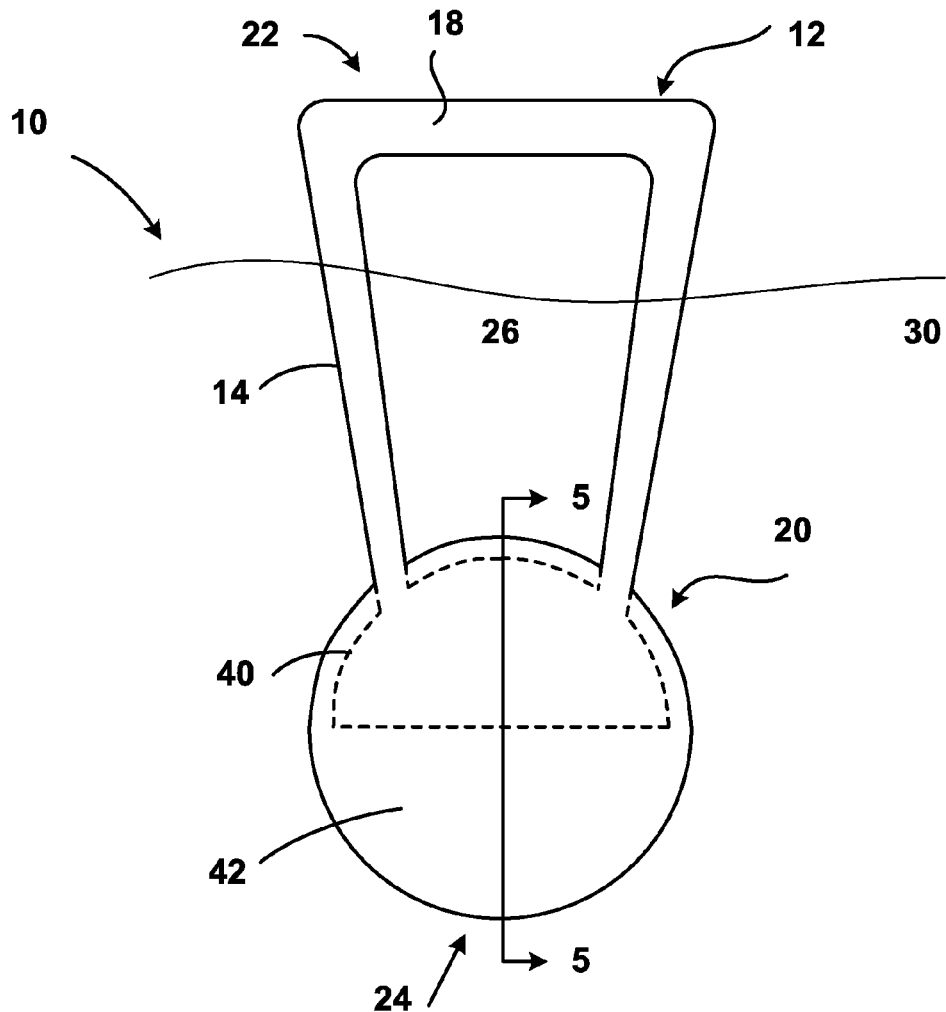
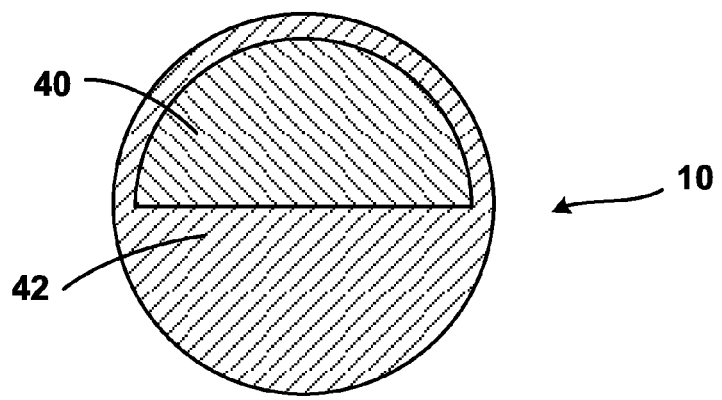

FLOATING PET TOY

FIELD OF THE INVENTION

The present disclosure relates to a floating pet toy, and more particularly to a floating pet toy which may float in a particular orientation so that the pet toy may be easily grasped and retrieved by a pet such as a dog.

BACKGROUND

A floating pet toy may enable pet owners to play fetch their pets, particularly dogs, in the water as well as on land. In addition, a floating pet toy may be used by certain pet owners to train their dogs to retrieve wild game/animals shot during hunting, particularly water fowl which have been shot over water.

As such, the pet toy must be sufficiently buoyant for the animal to locate, as well as sufficiently durable to be repeated used.

U.S. Pat. No. 5,904,118 to Markham discloses a floatable pet toy including a hollow deformable body with a buoyant material in the form of a closed cell foam inside of the body. Markham sets forth that the foam increases the pet toy's buoyancy and resistance to deformation for durability. However, while Markham may set forth that the foam increases resistance to deformation, the resistance offered by the foam may be understood to be limited, particularly given then foam is easily compressible as shown in FIG. 3 and may comprise light weight packing material such as packing peanuts.

U.S. Pat. No. 8,011,325 to Jager discloses a floatable pet toy which makes use of an airtight buoyant floatation bladder. However, if the bladder is punctured the toy may be understood to lose its floatation ability.

U.S. Pat. No. 8,474,410 to Oblack discloses a resilient animal throw-toy with a buoyant interior member. The throw-toys are disc-shaped as well as boomerang-shaped. However, due to the shape of the throw-toys such may be expected to be difficult for a pet to locate in the water.

As such, there is still a need to improve upon floating pet toys. What is need is a floating pet toy which is durable and easy for a pet to locate in the water.

SUMMARY

The present disclosure provides various embodiments of floating pet toys which may offer certain benefits as compared to pet toys known in the art.

In one embodiment, a pet toy to aid a pet in developing retrieval skills may be provided, comprising a first member at least partially encapsulated within a second member; wherein the first member is formed of a first member polymer composition having a density less than 1.0 gram/cubic centimeter; wherein the second member is formed of a second member polymer composition having a density greater than 1.0 gram/cubic centimeter; wherein the first member and the second member are provided at a weight ratio such that the pet toy floats when placed in water; and wherein the second member weighs down a second end of the pet toy in water such that a first end of the pet toy rises above the second end of the pet toy.

In another embodiment, a method of providing a floating pet toy is provided comprising forming a first member, wherein the first member is formed of a first member polymer composition having a density less than 1.0 gram/cubic centimeter; forming a second member which at least partially encapsulates the first member within the second member, wherein the second member is formed of a second member polymer composition having a density greater than 1.0 gram/cubic centimeter; providing the first member and the second member at a weight ratio such that the pet toy floats when placed in water; and forming the first member and the second member such that the second member weighs down a second end of the pet toy in water and a first end of the pet toy rises above the second end of the pet toy.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 3 is a side view of the floating pet toy of FIG. 1 located in water;

FIG. 4 is a side view of a second embodiment of a floating pet toy according to the present disclosure;

FIG. 5 is a cross-sectional view of the floating pet toy of FIG. 4 taken along line 5-5;

DETAILED DESCRIPTION

Figures 1, 2:
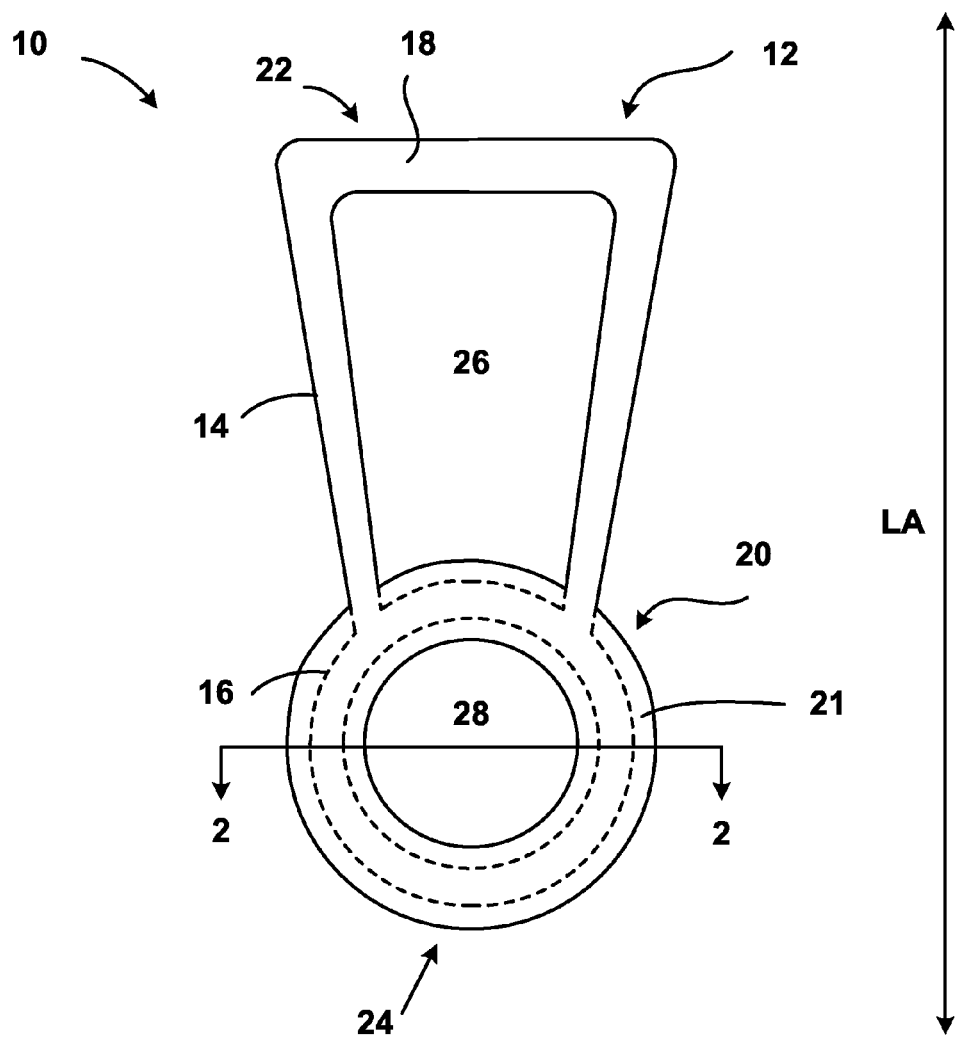
FIG. 1 is a side view of a first embodiment of a floating pet toy according to the present disclosure.
FIG. 2 is a cross-sectional view of the floating pet toy of FIG. 1 taken along line 2-2.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

In an exemplary embodiment, as illustrated in FIGS. 1-2, a floating pet toy 10 according to the present disclosure may comprise a first member 12 and a second member 20. As shown, first member 12 may form at least two enclosed rings, a first elongated ring 14 and a second circular ring 16, with the rings 14, 16 arranged planar and lateral to one another, and both having a cylindrical cross-section. Similarly, second member 20 includes ring shape 21.

First member 12 and second member 20 may each be formed of a resilient, pliable polymer composition, which may comprise one or more natural and/or synthetic polymers, such as a thermoplastic polymer or a thermoset polymer. More particularly, the first member 12 and the second member 20 may each be injection molded from a same or a different polymer composition which may comprise, essentially consists of, or consist of a thermoplastic elastomer and/or a thermoset elastomer. The polymer compositions may be differing with regards to chemical composition and/or one or more physical properties.

As used herein, an elastomer may include any polymer material with a glass transition temperature Tg below room temperature and which is at most, 50% crystalline (i.e., the material contains an amorphous phase of 50% or greater, up to 100% amorphous phase). The elastomer may also be characterized as a material that has an elongation at 23° C. of at least 100%, and which, after being stretched to twice its original length and being held at such for one minute, may recover in a range of 50% to 100% within one minute after release from the stress. More particularly, the elastomer may recover in a range of 75% to 100% within one minute after release from the stress, and even more particularly recover in a range of 90% to 100% within one minute after release from the stress.

Exemplary elastomers may include styrene block polymers, such as styrene block copolymers (e.g. styrene-butadiene copolymer) and styrene block terpolymers (e.g. styrene-butadiene-styrene terpolymer, styrene-ethylene/butylene-styrene terpolymer, styrene-ethylene/propylene-styrene terpolymer); polyolefin blends (e.g. polypropylene and ethylene-propylene-diene monomer rubber, polypropylene and nitrile rubber, ethylene-propylene rubber); elastomeric alloys such as melt-processable rubbers and thermoplastic vulcanizates; polyolefins; polyurethanes; polyesters; and rubbers such as natural rubber, neoprene rubber, acrylic rubber, butadiene rubber, butyl rubber, ethylene-propylene rubber, ethylene propylene diene monomer rubber, fluorocarbon rubber, isoprene rubber, nitrile rubber, polyurethane rubber and silicone rubber.

In certain embodiments, first member 12 may be formed of at least 90% by weight of styrene-ethylene/butylene-styrene (SEBS) terpolymer. Even more particularly, the first member polymer composition may comprise at least 95% by weight of styrene-ethylene/butylene-styrene (SEBS) terpolymer. The styrene-ethylene/butylene-styrene (SEBS) terpolymer may have a Shore A hardness, as measured by ASTM D2240-05 (2010), in a range of 35 to 85. Furthermore, the first member polymer composition may have a molded density of less than 1.0 gram/cubic centimeter, and more particularly less than 0.95 grams/cubic centimeter. The first member polymer composition may have a molded density in a range of 0.89 to 0.99 grams/cubic centimeter, and even more particularly in a range of 0.89 to 0.95 grams/cubic centimeter.

In certain embodiments, second member 20 which overlies second circular ring 16 may be formed of at least 90% by weight of natural rubber. Even more particularly, the second member polymer composition may comprise at least 95% by weight natural rubber. The rubber may have a Shore A hardness, as measured by ASTM D2240-05 (2010), in a range of 60 to 100, and may have a hardness in a range of 5-20 Shore A units greater than the first member 12. Furthermore, the second member polymer composition may have a molded density greater of than 1.0 gram/cubic centimeter, and more particularly in a range of 1.01 to 1.2 grams/cubic centimeter.

The polymer compositions which provide first member 12 and second member 20 may particularly be un-foamed or non-cellular. In other words, the polymer compositions may not be molded with numerous cells of gas distributed throughout the composition, such as by a chemical or physical blowing agent. Cellular compositions may be understood to be less durable than a non-cellular composition as the cellular composition may generally be understood to exhibit a lower tear strength than the non-cellular composition and thus more quickly damaged by a pet biting thereon.

As set forth above, first member 12 and the second member 20 may each be injection molded. More particularly, after first member 12 is formed from injection molding, second member 20 may be overmolded over at least a portion of first member 12. As shown, second member 20 may at least partially encapsulate first member 12 and, as shown, second member 20 may fully encapsulate the circular ring 16 of first member 12. The first member 12 may have a thickness (e.g. diameter) measured through either ring 14, 16 in a range of 2 mm to 6 mm. The second member 20 overmolded over the first member 12 may also have a thickness in a range of 2 mm to 6 mm. Given the arrangement as shown in FIGS. 1 and 2, first member 12 may also be referred to as the inner member, and second member 20 may be referred to as the outer member.

Depending on the compatibility of the two polymer compositions, as well as related processing temperatures, first member 12 and second member 20 may or may not be melt bonded together during the injection molding of the second member 20 over the first member 12. If no melt bonding occurs, the second member 20 may simply be mechanically joined to the first member 12 due to their respective geometries.

With the foregoing construction as shown, floating pet toy 10 may be understood to float in water having a density of 1.0 grams/cubic centimeter, particularly when the density of the first member 12 is less that 1.0 gram/cubic centimeter and the weight of the first member 12 and the second member 20 are provided in a suitable weight ratio for the pet toy 10 to float.

More particularly, floating pet toy 10 may provide a first end 22 and a second end 24, particularly arranged at opposing longitudinal ends of the toy 10 (i.e. relative to the longitudinal axis LA of the toy 10), with different floating characteristics. In addition, when in water, the floating pet toy 10 may float in a particular orientation.

More particularly, as shown in FIG. 3, when in water 30, the second member 20 may weigh down a second end 24 of the floating pet toy 10 in relation to a first end 22, such that the first end 22 of the pet toy 10 rises above the second end 24 and is closer to the surface of the water than the second end 24. In this manner, the distal (terminal) end portion 18 of the elongated ring 14 of first member 12 at the first end 22 may rise above the surface of the water to become more visible to a pet, such as a dog, seeking to retrieve floating pet toy 10 in the water. Furthermore, the distal end portion 18 is arranged horizontally such that the dog may easily grasp such between the upper and lower jaw by placing the upper jaw above distal end portion 18 and the lower jaw in the aperture 26 of elongated ring 14 below distal end portion 18 and thereafter closing his jaw thereon. Conversely, if floating pet toy 10 was only formed of first member 12, the toy 10 may be expected to float in the water with both rings 14, 16 planar with the surface, making it difficult to see by the dog as the toy 10.

With the foregoing construction, floating pet toy 10 may also provide a first end 22 and a second end 24 with different levels of hardness, texture and durability, which may provide different biting characteristics to entice a pet. For example, first end 22 may have a first biting characteristic provided, for example, by a first hardness of first member 12, while second end 24 has a second biting characteristic provided, for example, by a different hardness (i.e. combined hardness of the second member 20 overlying first member 12) than the first end 22.

When the first member 12 is formed of styrene-ethylene/butylene-styrene (SEBS) terpolymer, and the second member 20 is formed of natural rubber, the styrene-ethylene/butylene-styrene (SEBS) terpolymer of the first member 12 may have a lower hardness than the natural rubber of the second member 20, and the first end 22 may provide a softer biting characteristic to a pet than second end 24.

However, while the second end 24 may have a harder biting characteristic than first end 22, the lower hardness of the first member 14 beneath second member 20 ensures that the second end portion will not be so hard that a pet completely avoids biting on second end 24. Further, in addition to the natural rubber having a greater hardness than the styrene-ethylene/butylene-styrene (SEBS), the natural rubber also may have greater durability (e.g. tear strength) than the styrene-ethylene/butylene-styrene (SEBS). As such, the second end 24 of the floating pet toy 10 may be better suited for pets which are more aggressive biters.

Referring now to FIG. 4-5, there is shown a second embodiment of the present disclosure with ring 16 of the first member 12 being replaced with a (hemi) spherical portion 40. In addition to second member 20 encapsulating spherical portion 40, second member 40 also provides a second (hemi) spherical portion 42 which, when combined with first spherical portion 30 forms the second end 24 of floating pet toy 10 into a bulbous end and more particularly a sphere.

Similar to the first embodiment, the second member 20, and more particularly the second spherical portion 42 may weigh down second end 24 of the floating pet toy 10 in relation to a first end 22, such that the first end 22 of the pet toy 10 rises above the second end 24 and is closer to the surface of the water than the second end 24. Again, in this manner, the terminal end portion 18 of the elongated ring 14 of first member 12 at the first end 22 may rise above the surface of the water to become more visible to a pet, such as a dog, seeking to retrieve floating pet toy 10 in the water.

Figure 6:
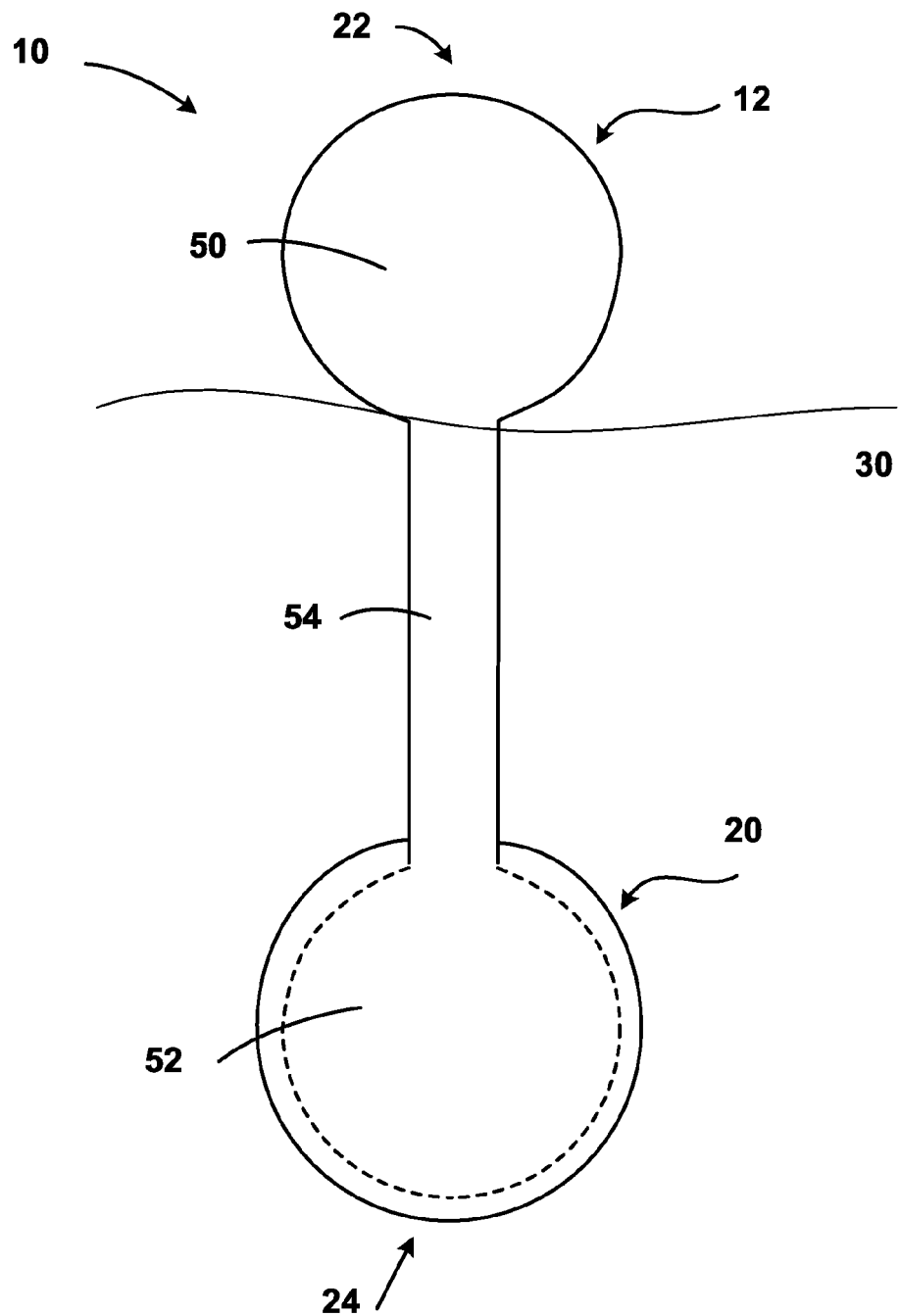
FIG. 6 is a side view of a third embodiment of a floating pet toy according to the present disclosure.

Referring now to FIG. 6, there is shown a third embodiment of the present disclosure with the first member 12 comprising enlarged bulbous, and more particularly spherical, longitudinal ends 50 and 52 joined by a medial shaft portion 54. In the foregoing manner, longitudinal ends 50, 52 may simulate condyle portions of a bone. As with the previous embodiments, floating pet toy 10 may provide a first end 22 and a second end 24, particularly arranged at opposing longitudinal ends of the toy 10 (i.e. relative to the longitudinal axis LA of the toy 10), with different floating characteristics.

More particularly, as shown in FIG. 6, when in water 30, the second member 20 may weigh down a second end 24 of the floating pet toy 10 in relation to a first end 22, such that the first end 22 of the pet toy 10 rises above the second end 24 and is closer to the surface of the water than the second end 24.

Figure 7:
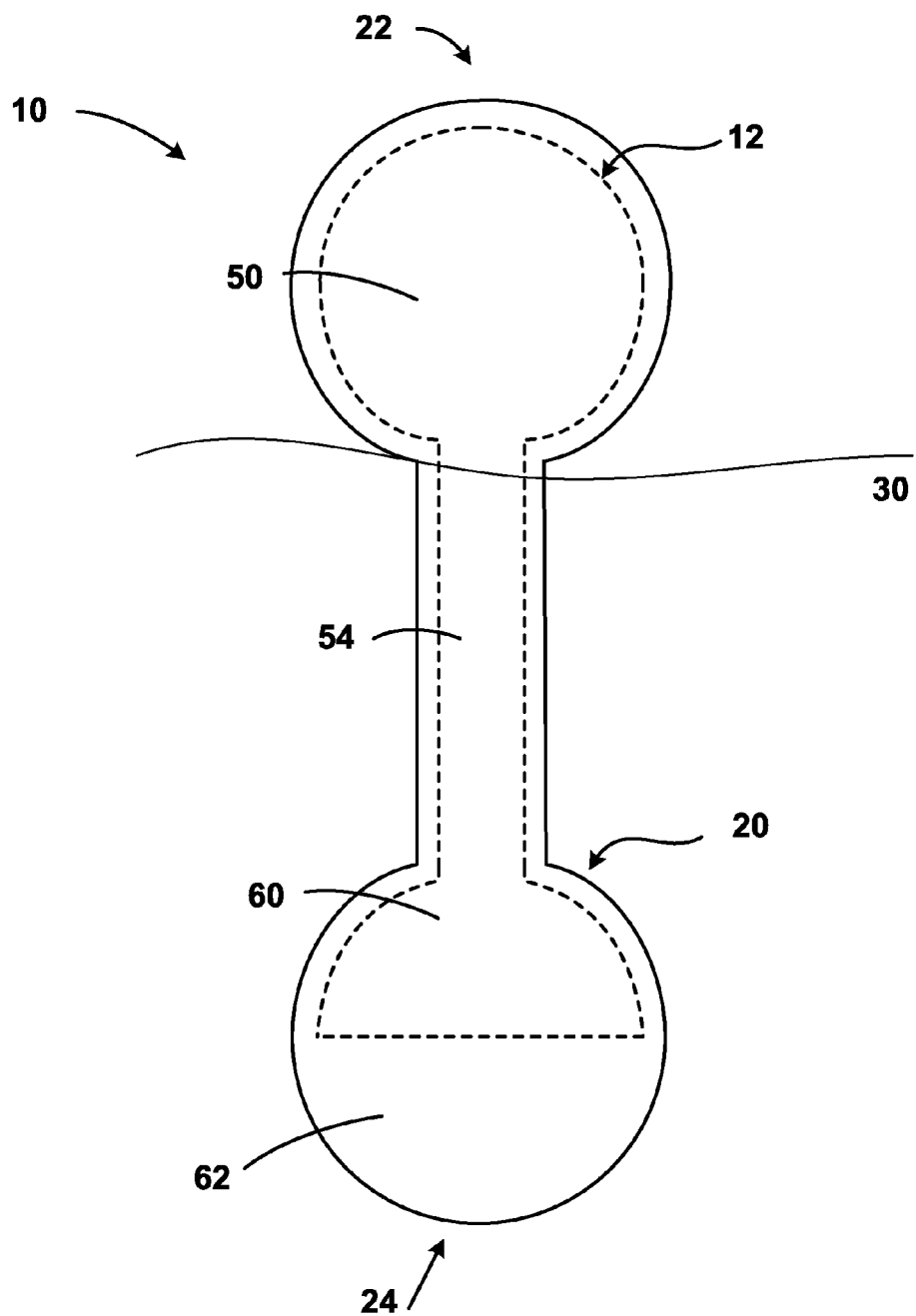
FIG. 7 is a side view of a fourth embodiment of a floating pet toy according to the present disclosure.

Referring now to FIG. 7, there is shown a fourth embodiment of the present disclosure with the first member 12 comprising an enlarged, and more particularly spherical longitudinal end 50 at one end of medial shaft 54, and a (hemi) spherical portion 60 at the other end of medial shaft 54. Unlike the previous embodiments, the second member 20 may completely encapsulate first member 12, while at the same time providing a second (hemi) spherical portion 62 which, when combined with first spherical portion 60 forms second end 24 of floating pet toy 10 into a bulbous end and more particularly a sphere.

As with the previous embodiments, floating pet toy 10 may provide a first end 22 and a second end 24, particularly arranged at opposing longitudinal ends of the toy 10 (i.e. relative to the longitudinal axis LA of the toy 10), with different floating characteristics.

More particularly, as shown in FIG. 7, when in water 30, the second member 20 may weigh down a second end 24 of the floating pet toy 10 in relation to a first end 22 (which is only formed of first member 12), such that the first end 22 of the pet toy 10 rises above the second end 24 and is closer to the surface of the water than the second end 24.

Thus, in light of the foregoing a pet toy to aid a pet in developing retrieval skills may be provided, comprising a first member at least partially encapsulated within a second member; wherein the first member is formed of a first member polymer composition having a density less than 1.0 gram/cubic centimeter; wherein the second member is formed of a second member polymer composition having a density greater than 1.0 gram/cubic centimeter; wherein the first member and the second member are provided at a weight ratio such that the pet toy floats when placed in water; and wherein the second member weighs down a second end of the pet toy in water such that a first end of the pet toy rises above the second end of the pet toy.

Additionally, a method of providing a floating pet toy is provided comprising forming a first member, wherein the first member is formed of a first member polymer composition having a density less than 1.0 gram/cubic centimeter; forming a second member which at least partially encapsulates the first member within the second member, wherein the second member is formed of a second member polymer composition having a density greater than 1.0 gram/cubic centimeter; providing the first member and the second member at a weight ratio such that the pet toy floats when placed in water; and forming the first member and the second member such that the second member weighs down a second end of the pet toy in water and a first end of the pet toy rises above the second end of the pet toy.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A pet toy comprising:
   a first member at least partially encapsulated within a second member;
   wherein the first member is formed of a first member polymer composition having a density less than 1.0 gram/cubic centimeter;
   wherein the second member is formed of a second member polymer composition having a density greater than 1.0 gram/cubic centimeter;
   wherein the first member and the second member are provided at a weight ratio such that the pet toy floats when placed in water; and
   wherein the second member weighs down a second end of the pet toy in water such that a first end of the pet toy rises above the second end of the pet toy.

2. The pet toy of claim 1 wherein:
   the first member polymer composition has a density in a range of 0.89 to 0.99 gram/cubic centimeter.

3. The pet toy of claim 1 wherein:
   the first member polymer composition is non-cellular.

4. The pet toy of claim 1 wherein:
   the first member polymer composition is an elastomer.

5. The pet toy of claim 1 wherein:
   at least 90% by weight of the first member polymer composition is styrene-ethylene/butylene-styrene terpolymer.

6. The pet toy of claim 1 wherein:
   the second member polymer composition is an elastomer.

7. The pet toy of claim 1 wherein:
   at least 90% by weight of the second member polymer composition is rubber.

8. The pet toy of claim 1 wherein:
   the second member is molded over the first member.

9. The pet toy of claim 1 wherein:
the second member is bonded to the first member.

10. The pet toy of claim 1 wherein:
the second member has a thickness in a range of 2 mm to 6 mm.

11. The pet toy of claim 1 wherein:
the first member has a lower hardness than the second member.

12. The pet toy of claim 11 wherein:
the first member has a Shore A hardness of 5-20 less than a Shore A hardness of the second member.

13. The pet toy of claim 11 wherein:
the first member has a hardness in a range of 35-85 Shore A.

14. The pet toy of claim 11 wherein:
the second member has a hardness in a range of 60-100 Shore A.

15. The pet toy of claim 1 wherein:
at least one of the first end and the second end of the pet toy comprises a ring.

16. The pet toy of claim 1 wherein:
at least one of the first end and the second end is bulbous.

17. The pet toy of claim 1 wherein:
at least one of the first end and the second end is spherical.

18. The pet toy of claim 1 wherein:
at least a portion of the first end rises above a surface of the water.

19. The pet toy of claim 1 wherein:
at least a portion of the first end rises above a surface of the water such that the pet can grasp the pet toy above the surface of the water.

20. A method of providing a floating pet toy comprising:
forming a first member, wherein the first member is formed of a first member polymer composition having a density less than 1.0 gram/cubic centimeter;
forming a second member which at least partially encapsulates the first member within the second member, wherein the second member is formed of a second member polymer composition having a density greater than 1.0 gram/cubic centimeter;
providing the first member and the second member at a weight ratio such that the pet toy floats when placed in water; and
forming the first member and the second member such that the second member weighs down a second end of the pet toy in water and a first end of the pet toy rises above the second end of the pet toy.

\* \* \* \* \*